Dec. 16, 1930.   H. S. TAYLOR   1,784,978
TESTING APPARATUS
Filed April 23, 1929

INVENTOR
H. S. TAYLOR
BY G. M. Campbell
ATTORNEY

Patented Dec. 16, 1930

1,784,978

UNITED STATES PATENT OFFICE

HUGH S. TAYLOR, OF JACKSON HEIGHTS, NEW YORK, ASSIGNOR TO BELL TELEPHONE LABORATORIES, INCORPORATED, OF NEW YORK, N. Y., A CORPORATION OF NEW YORK

TESTING APPARATUS

Application filed April 23, 1929. Serial No. 357,369.

This invention relates to testing apparatus of the type disclosed in the J. C. Franfield Patent 1,615,219, January 25, 1927, and the object of it is to simplify and improve the structure whereby connections may be more readily and positively made with cord shelf terminals.

Features of this invention relate to the form and construction of the test members for securing a positive and rigid connection between the cooperating parts, the combination and form of the parts for permitting use of the same apparatus with structures in which the spacing of parts may vary over a comparatively wide range, and the location and mounting of the connecting members in a relation similar to that of the parts with which they cooperate in use.

On cord shelf terminal boards which are located at the back of an operator's switchboard, tip, ring and sleeve terminals are mounted. These terminals are connected to the tip, ring and sleeve conductors of an operator's cord circuit in which are certain relays, the operation of which it is desired at times to have tested. It is customary therefore to connect to the cord shelf terminals certain testing apparatus by which normal line conditions may be simulated and to note by observation of suitable indicators in the testing apparatus, the degree of faithfulness with which the relays perform.

The cord shelf terminals are arranged on the terminal boards in rows set in staggered relationship one with the other. Not infrequently there is some slight variation in spacing of these terminals due to inaccuracy in the securing of them to the board or to bending of the terminals during the connecting thereto of some of the cord circuit wires. It also happens that the staggered position of the rows of terminals one with the other may vary or be reversed from the standard arrangement and it is to facilitate the connecting of testing apparatus to these terminals of off-normal spacing and arrangement as well as to secure a more positive and rigid connection to the terminals, that this improved testing apparatus has been devised.

Figure 1:
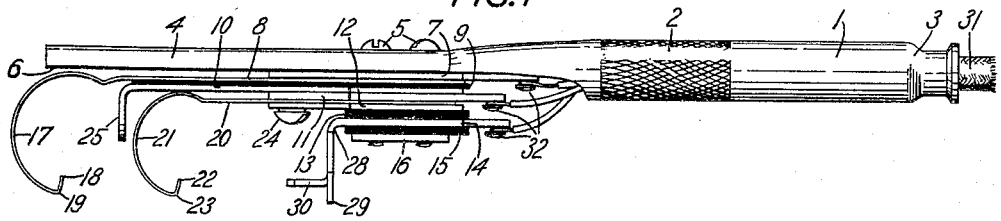
Figure 2:
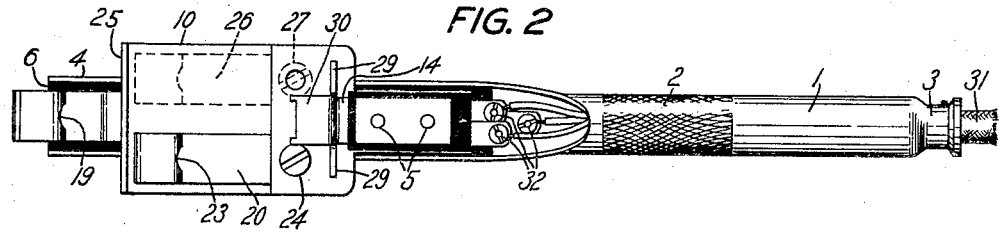
Figure 3:
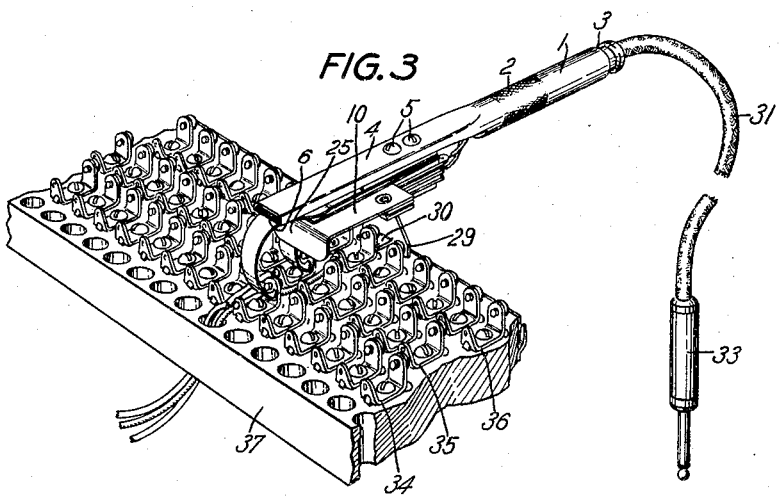
Figure 4:
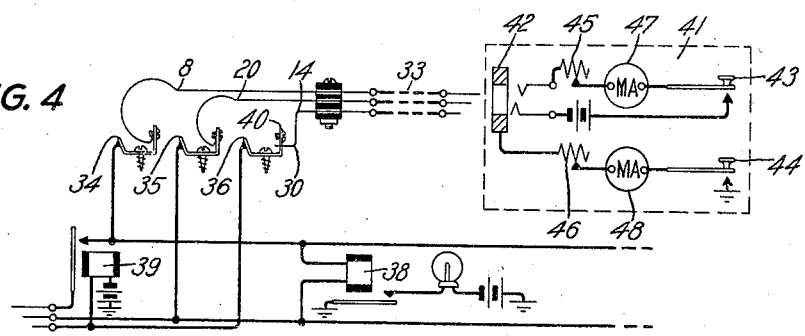

In the accompanying drawing, Figs. 1 and 2 are a side and an under surface plan view, respectively, of an improved test connector. Fig. 3 is a view in perspective of a portion of a cord shelf terminal board with the improved test connector engaging a set of terminals thereon, and Fig. 4 is a diagrammatic representation of one end of a cord circuit with the improved test connector engaging a set of terminals thereof and a test set with which the plug of the test connector may be connected.

To further explain this invention, reference will now be made to the various parts beginning with the improved connecting device shown in detail in Figs. 1 and 2 and in which 1 is a tubular handle portion having a knurled grip at 2, a reduced portion at 3 and an integral extended channel portion at 4. Secured within the channel portion 4, by means of screws 5, is an insulating strip 6. Stacked on the screws 5 are a metal terminal plate 7, a spring contact 8, an insulating strip 9, a metal guard 10, a metal terminal plate 11, a metal plate 12, an insulating piece 13, a substantially rigid contact 14, and insulating piece 15 and a metal plate 16 equipped with threaded holes to receive the screws 5.

The spring contact 8 has a hook portion 17 at one end which terminates in an upturned portion 18 and is apertured at 19. A spring contact 20, similar to the spring contact 8, having a hook portion 21 terminating in an upturned portion 22 and apertured at 23, is frictionally held between the metal terminal plate 11 and the metal plate 12 which are pulled toward each other by a screw 24. The guard 10 which is a substantially broad flat metal piece terminates at one end in a downwardly turned portion 25 which prevents extension of the spring contact 20 beyond a certain limit. The plates 11 and 12, between which the spring contact 20 is frictionally held, are of substantially the same width as the guard 10 and arranged so that the spring contact 20 may be held in either the full line position as shown or in the dotted line position indicated at 26. To change the spring contact 20 from the full line position to the dotted line position, the screw 24 is removed and placed in the position shown in dotted line 27. The spring contact is moved over to the dotted line position shown at 26 and the screw 24 at position 27 is turned to pull the plates 11 and 12 toward each other.

The rigid contact 14, which is a flat metal strip is turned in a downward direction at 28 and terminates in heel portions 29 and a right angular extending pronged portion 30.

The tip, ring and sleeve strands respectively of a standard cord 31 which traverses the handle portion 1 are attached to the contact 8, the plate 11 which engages contact 20, and contact 14, as shown at 32 and lead to a standard plug 33 by which the test connector may be brought into circuit connection with suitable testing equipment as shown in Fig. 4.

In the diagrammatic arrangement shown in Fig. 4 the tip, ring and sleeve terminals 34, 35 and 36, respectively, are representative of a set of such terminals as shown in Fig. 3 as mounted on a cord shelf terminal board 37. The tip and ring terminals 34 and 35 are in circuit connection with a supervisory relay 38 and a sleeve relay 39 is connected to the sleeve terminal 36.

When it is desired to test the operation of relays 38 and 39, the test connector is brought into connection with the tip, ring and sleeve terminals 34, 35 and 36 by first hooking the spring contact 8 to the terminal 34, then hooking the spring contact 20 to the terminal 35 and pulling on the handle 1 until rigid contact 14 is over the vertical portion 40 of the terminal 36. By pressing downward and releasing the handle 1, the rigid contact 14 is permitted to be drawn against the terminal 36 where by means of the spring tension in the contacts 8 and 20, it is held against the terminal 36 in good electrical connection.

The spring tension of the contacts 8 and 20 holds all of the contacts in good electrical connection with the cord shelf terminals and accidental displacement of the contacts from the terminals is prevented by the apertures 19 and 23 in the ends of the spring contacts 8 and 20, respectively, and the prongs on the right angular extending portion 30 of the rigid contact 14. The heel portions 29 of the rigid contact 14 rest on the cord shelf terminal board 37 and prevent side play and tilting of the connecting device.

Testing apparatus 41 is coupled to the test connector by inserting the plug 33 in jack 42 and testing of the operation of the relays 38 and 39 is accomplished by simulating line conditions through operation of the keys 43 and 44 and adjustment of the variable resistance elements 45 and 46. By observation of the milliammeters 47 and 48 the degree of faithfulness of operation of the relays 38 and 39 may be noted and the adjustment required to bring them to most efficient operation determined.

What is claimed is:

1. An electrical connecting device adapted to connect testing apparatus to terminals on a cord shelf and having supported on a handle member a plurality of aligned terminal connecting members and other terminal connecting means not in alignment with and movable with respect to the said aligned members.

2. An electrical connecting device adapted for hand attachment to terminals on a cord shelf and having a handle portion, a shank portion extending from the handle, and a plurality of terminal engaging members supported on the shank, one of said terminal engaging members being movable to the right or left of a longitudinal line cutting the other terminal engaging members.

3. An electrical connecting device comprising a hollow handle portion terminating in a shank portion, a plurality of hook shaped spring contact members one of which is laterally movable and may be fixed in offset position relative to another, and a rigid contact member supported on the shank portion, an extension cord connected to the contact members and having a device for connecting to testing apparatus.

4. An electrical connecting device comprising a hollow handle portion, a shank portion integral with and extending from the hollow handle portion, a plurality of hook shaped flat spring contact members one of which is in an offset position from another and may be set in either a right or left offset position, and one rigid contact member insulatingly supported on the shank portion, and an extension cord connected at one end to the contact members on the connecting device and having at the other end means to connect to testing apparatus.

5. An electrical connecting device having a hollow handle, a shank portion integral with the hollow handle, hook shaped flat spring contact members, and a comparatively rigid bar contact member insulatingly supported on the shank portion, one of said spring contact members secured in offset position with respect to the other contact members and movable as a whole to right or left thereof, an extension cord having a plurality of conductor members each connected to one of the contact members, the said extension cord being threaded through the hollow handle of the connecting device and having at one end a plug for connecting it to suitable electrical testing apparatus.

6. An electrical connecting device adapted to connect testing apparatus to the terminals on a bank of cord shelf terminals and comprising a handle having a shank portion on which are insulatingly supported a plurality of hook-shaped spring terminal engaging members, a flat substantially rigid terminal engaging member, and a stop member to limit movement of one of the hook-shaped spring terminal engaging members in one direction.

7. An electrical connecting device for connecting testing apparatus to cord shelf terminals and having supported on a handle member a hook-shaped spring connecting member in longitudinal alignment with a rigid connecting member, an intermediate hook-shaped spring member laterally adjustable with respect to the longitudinally aligned members, and a stop to limit movement of said intermediate hook-shaped spring member in one direction.

8. An electrical connecting device adapted to be brought into engagement with terminals on a cord shelf comprising a handle member supporting in alignment, a hook-shaped spring contact member and a rigid contact member and having an intermediate laterally adjustable spring contact member, and means on said rigid contact member to prevent lateral movement of the connecting device when brought into engagement with the cord shelf terminals.

9. An electrical connecting device to engage tip, ring and sleeve terminals on a cord shelf comprising a handle portion supporting a comparatively long hook-shaped spring member, a shorter hook-shaped spring member, and a rigid bar member to engage the tip, ring and sleeve terminals respectively.

10. An electrical connecting device for connecting suitable testing apparatus to terminals on a cord shelf and comprising a hollow handle having a channeled shank portion, a plurality of resilient terminal engaging members, and a substantially rigid terminal engaging member supported on the shank portion, one of said resilient terminal engaging members and the rigid terminal engaging member being in longitudinal alignment and the other resilient terminal engaging member being movable to right and left positions with respect to a longitudinal line cutting the other terminal engaging members.

11. An electrical connecting device to engage tip, ring and sleeve terminals in a bank of cord shelf terminals comprising a handle member supporting a tip terminal engaging member, a ring terminal engaging member and a sleeve terminal engaging member, said tip and sleeve terminal engaging members being in longitudinal alignment and said ring terminal engaging member being laterally adjustable with respect to them, said terminal engaging members being held in engagement with the terminal members in the bank by spring pressure developed in both the tip and ring terminal engaging members.

12. An electrical connecting device adapted to engage tip, ring and sleeve terminals on a cord shelf comprising a handle portion supporting a spring member to engage the tip terminal, a spring member to engage the ring terminal, and a flat bar member to engage the sleeve terminal, said connecting device being maintained in engagement with the cord shelf terminals by spring pressure developed solely within the spring members which engage the tip and ring terminals.

In witness whereof, I hereunto subscribe my name this 20th day of April, 1929.

HUGH S. TAYLOR.